(12) United States Patent
Guatto et al.

(10) Patent No.: US 8,228,034 B2
(45) Date of Patent: Jul. 24, 2012

(54) METHOD AND SYSTEM FOR LOAD SHIFTING

(76) Inventors: Dan Guatto, Mississauga (CA); Art Skidmore, Guelph (CA)

( * ) Notice: Subject to any disclaimer, the term of this patent is extended or adjusted under 35 U.S.C. 154(b) by 1003 days.

(21) Appl. No.: 11/958,650

(22) Filed: Dec. 18, 2007

(65) Prior Publication Data

US 2009/0153102 A1 Jun. 18, 2009

(51) Int. Cl.
*H02J 7/00* (2006.01)
*H02J 9/00* (2006.01)

(52) U.S. Cl. ............................. 320/132; 307/65; 307/66

(58) Field of Classification Search ................. 307/65, 307/66; 320/132, 134–136
See application file for complete search history.

(56) References Cited

U.S. PATENT DOCUMENTS

| | | | |
|---|---|---|---|
| 4,532,769 A | 8/1985 | Vestermark | |
| 4,894,764 A | 1/1990 | Meyer et al. | |
| 5,368,957 A | 11/1994 | Kozmik et al. | |
| 5,589,727 A | 12/1996 | Seward | |
| 5,614,777 A | 3/1997 | Bitterly et al. | |
| 5,655,617 A | 8/1997 | Marshall | |
| 5,931,249 A | 8/1999 | Ellis et al. | |
| 5,936,375 A | 8/1999 | Enoki | |
| 5,939,798 A | 8/1999 | Miller | |
| 6,621,181 B2 | 9/2003 | McCombs | |
| 7,248,490 B2 * | 7/2007 | Olsen et al. | 363/71 |
| 2002/0000306 A1 | 1/2002 | Bradley | |
| 2002/0041126 A1 | 4/2002 | Provanzana et al. | |
| 2006/0276938 A1 | 12/2006 | Miller | |

OTHER PUBLICATIONS

Roy C. Galloway and Steven Haslam, Dec. 1999, Journal of Power Sources 80, p. 1 The Zebra electric Vehicle Battery: power and energy improvements.*

Hamilton, "Acton utility flicks switch to launch 'load shifting' test," Toronto Star, Jul. 11, 2006 (2 pages).
"Battery Load Shifting & Storage Project," LDC Tomorrow Fund: Project Updates, vol. 2, Issue 1, Oct. 2006 (4 pages).
"Halton Hills Launches Innovative Battery Technology to test Load Shifting," Market Watch, Fall 2006 (1 page).
Galloway et al., "The ZEBRA electric vehicle battery: power and energy improvements," ScienceDirect—Journal of Power Sources, vol. 80, Issues 1-2, Jul. 1999, Abstract (2 pages).
Galloway et al., "ZEBRA Battery—Material Cost Availability and Recycling," presented at EVS-20, Nov. 15-19, 2003, Long Beach, CA (9 pages).
Bull et al., "Development of New Types of Zebra Batteries for Various Vehicle Applications," presented at EVS 18, Berlin, Oct. 2001 (9 pages).
Boys, "CAN: Controller Area Network Introduction and Primer," Dearborn Group Technology, Sep. 2004, Version 3.1 (8 pages).

* cited by examiner

*Primary Examiner* — Richard V Muralidar
(74) *Attorney, Agent, or Firm* — Kilyk & Bowersox, P.L.L.C.

(57) ABSTRACT

There is provided a system for storing electrical energy during an off-peak period and distributing the electrical energy to consumers during a peak period. The system includes an energy storage means for storing the electrical energy; a first means for directing the electrical energy produced during the off-peak period into the energy storage means; and a second means for directing the electrical energy from the energy storage means to consumers during the peak period. Preferably, the energy storage means consists of five sodium-nickel-chloride batteries having a specific energy in the range of about 80 to about 200 Wh/kg, preferably about 100 to about 150 Wh/kg, and most preferably about 120 Wh/kg.

18 Claims, 2 Drawing Sheets

METHOD AND SYSTEM FOR LOAD SHIFTING

FIELD OF THE INVENTION

The present invention relates to an electrical energy storage system, and more particularly to a method and system for shifting of a load so that electrical energy can be stored during a period of off-peak demand and then distributed and sold during a peak period of demand.

BACKGROUND OF THE INVENTION

There currently are three principle ways that electrical energy is commercially generated: by burning fossil fuels, by using nuclear energy and by renewable means. Electrical energy is produced by one or more of these ways and then supplied to the market as needed for consumption. However, electrical energy demand is not consistent—there are many fluctuations resulting in peak periods where demand is increased and off-peak periods where demand for electrical energy is less. It is often a challenge for utilities to meet the increased demand during peak periods, but on the other hand there may be an over-abundance of electrical energy generated during off-peak periods.

In many instances, power generating units, such as coal-fired plants or nuclear plants, are run continuously because the cost of shutting down and starting up the units are prohibitively high. Thus, not all of the electrical energy generated by these units may be consumed during off-peak periods. In addition, in wholesale energy markets, electrical energy is purchased and sold at market prices, which fluctuates depending on consumer demand. Thus, during off-peak periods, electrical energy may have to be sold at a market price lower than the cost to produce the electrical energy. The market price of electrical energy during off-peak periods is generally less than the price of electrical energy during peak periods.

It would be advantageous, therefore, to provide a method and system that allows electrical energy-generating utilities to store excess electrical energy that is generated during off-peak periods, and then sell that stored electrical energy during peak periods. There have been a variety of methods and systems suggested for storing electrical energy (discussed below), but there still remains a need for a system and method for storing electrical energy during off-peak periods and distributing the stored electrical energy during peak periods.

Examples of methods and systems suggested in the prior art include:

a. U.S. Patent Application Publication No. 2006/0276938 μl published on Dec. 7, 2006 describes a method and system for optimizing the control of energy supply and demand. An energy control unit is provided to control energy consumption by devices on the basis of supply and demand. Battery storage and alternative energy sources (e.g., photovoltaic cells) are activated to sell energy to the power grid during peak periods.

b. U.S. Patent Application Publication No. 2002/0041126 A1, published on Apr. 11, 2002 describes a power load-levelling system and packet electrical storage utilizing a plurality of capacitors. The capacitors are charged with electrical energy produced by the utility during off-peak periods, and discharged during peak periods.

c. U.S. Patent Application Publication No. 2002/0000306 A1, published on Jan. 3, 2002, describes a method and device for storing energy utilizing phase change material. The device includes at least one phase change material being capable of undergoing a phase change at a functional temperature, and a heat transfer fluid.

d. U.S. Pat. No. 4,532,769, issued on Aug. 6, 1985 describes an energy storing flywheel assembly.

e. U.S. Pat. No. 4,894,764, issued on Jan. 16, 1990 describes an electric load levelling system that includes a plurality of individual modules for storing and supplying AC electrical energy. Each module includes a plurality of individual batteries for storing DC electrical energy. A power conversion mechanism is also provided for converting input AC power for storage in DC battery cells, and output DC power from the batteries to AC for supply to an input/output line. The system stores electrical energy during off-peak periods, and outputs such stored energy during peak periods.

f. U.S. Pat. No. 5,368,957, issued on Nov. 29, 1994 describes an energy storage device with novel anode and cathode materials. The cathode is a solid solution or composite material of two or more compounds of a layered crystalline material, and the anode includes electro-active species selected from the group comprising lithium, sodium and potassium and alloys with other materials.

g. U.S. Pat. No. 5,589,727, issued on Dec. 31, 1996 describes an energy storage device in which a vacuum tube and a magnetic field are used to store electrons circulating within the tube along spiral paths.

h. U.S. Pat. No. 5,614,777, issued on Mar. 25, 1997 describes an energy storing device comprising a high speed rotating flywheel and an integral motor/generator unit.

i. U.S. Pat. No. 5,655,617, issued on Aug. 12, 1997 describes a means for storing kinetic energy using an elastomeric member and a plurality of offset pulleys.

j. U.S. Pat. No. 5,931,249, issued on Aug. 3, 1999 describes a kinetic energy storage system which utilizes a flywheel with a motor generator to store energy.

k. U.S. Pat. No. 5,936,375, issued on Aug. 10, 1999, describes a method and system for energy storage and recovery for load hoisting equipment. The system includes an inverter controlled first induction motor and a second inverter controlling a second induction motor which drives a flywheel.

l. U.S. Pat. No. 5,939,798, issued on Aug. 17, 1999 describes an energy storage system including a first power conversion device and a second power conversion device for providing energy to loads upon interruption of a main power source.

m. U.S. Pat. No. 6,621,181, issued on Sep. 16, 2003, describes a system whereby a plurality of batteries are connected to the power grid. The batteries can alternately charge during off-peak periods and discharge during peak periods. The system is located within existing rights of way to allow the existing grid to be retrofitted to deliver more power without the need for costly and time consuming negotiations for new rights of way.

The disclosures of all patents/applications referenced herein are incorporated herein by reference.

SUMMARY OF THE INVENTION

The present invention provides an electrical energy storage system that is useful for load shifting and levelling, together with a method for doing so. Specifically, the present invention relates to a method and system for shifting of an electrical energy load so that electrical energy from a power grid may be stored during off-peak periods, and then distributed into the power grid during peak periods of the demand.

According to one aspect of the invention, there is provided a system for storing electrical energy during an off-peak period and distributing the electrical energy during a peak period. The system comprises a first means for directing electrical energy produced during the off-peak period into an energy storage means for storing energy. The system also includes a second means for directing electrical energy from the energy storage means into the market during the peak period. The energy storage means is at least one sodium-nickel-chloride battery having a specific energy in the range of about 80 to about 200 Wh/kg.

In a further aspect of the present invention, there is provided a method of storing electrical energy during an off-peak period and distributing the electrical energy during a peak period. The method includes the steps of directing electrical energy that is produced during the off-peak period into an energy storage means, storing the produced electrical energy in the energy storage means, and directing the electrical energy stored in the energy storage means into the power grid during the peak period. The energy storage means is at least one sodium-nickel-chloride battery having a specific energy in the range of about 80 to about 200 Wh/kg. In a further embodiment of the method, the peak period is when the market cost of the electrical energy is higher than the market cost of the electrical energy during the off-peak period.

In yet a further aspect of the present invention there is provided an electrical load levelling system. The system comprises at least one charger for converting alternating current into direct current, a multiple battery server for controlling the flow of the alternating current into at least one charger, at least one energy storing device for storing the direct current electrical energy from a corresponding charger, and a power management cabinet for controlling the discharge of stored electrical energy from each storage device, wherein the energy storage device is a sodium-nickel-chloride battery having a specific energy in the range of about 80 to about 200 Wh/kg.

Numerous other objectives, advantages and features of the process will also become apparent to the person skilled in the art upon reading the detailed description of the preferred embodiments, the examples and the claims.

BRIEF DESCRIPTION OF THE DRAWINGS

The preferred embodiments of the present invention will be described with reference to the accompanying drawings in which like numerals refer to the same parts in the several views and in which.

DETAILED DESCRIPTION OF THE PREFERRED EMBODIMENTS

The preferred embodiments of the present invention will now be described with reference to the accompanying figures.

Figure 1:
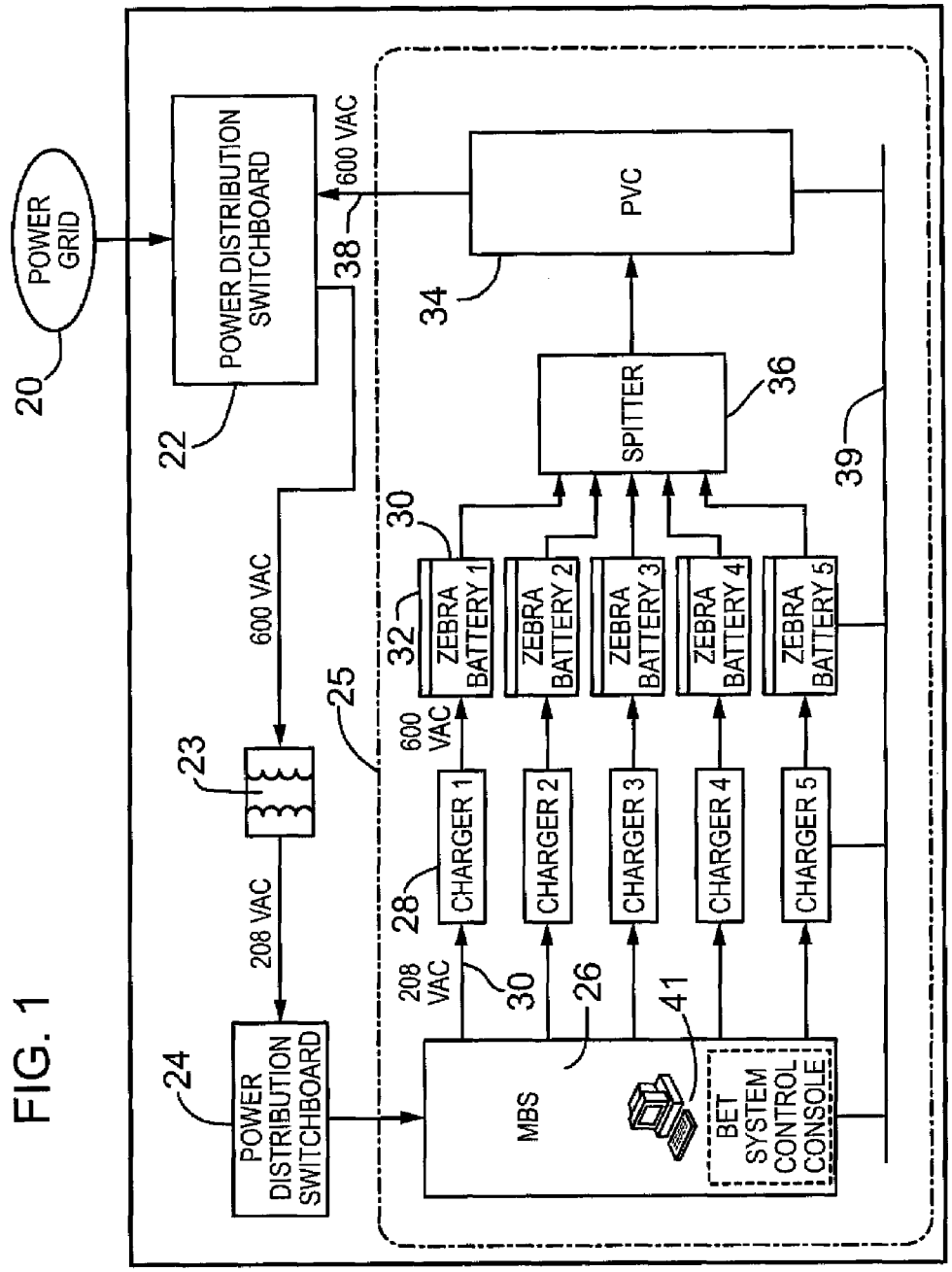
FIG. 1 shows the preferred system of the present invention in which five ZEBRA® sodium-nickel-chloride batteries are provided.

FIG. 1 illustrates a preferred embodiment of the system of the present invention. Electrical energy from the power grid 20 is directed to a power distribution switchboard 22. As is typical, the electrical energy is alternating current at about 600 volts. The electrical energy is converted to approximately 208 VAC (volts alternating current) in transformer 23. The 208 VAC current then enters the storage system 25 via a power distribution switchboard 24. From the power distribution switchboard 24, the 208 VAC current is directed to a multiple battery server 26 and then to a series of chargers 28 via dedicated 208 VAC lines 30.

The multiple battery server 26 controls the power flow to each charger 28. The multiple battery server 26 either allows 208 VAC current to flow into a particular charger 28, or the multiple battery server 26 restricts the flow of the 208 VAC current to the charger 28. The multiple battery server 26 thus controls all flow of current to the chargers 28. In this way, 208 VAC current may be directed to the chargers 28 when there is excess electrical energy in the power peer grid 20 during off-peak periods, and restricted when there is no excess of electrical energy.

Each charger 28 converts the 208 VAC electrical energy into about 600 volts direct current (VDC). The 600 VDC electrical energy from each charger 28 is directed to and then stored in a corresponding energy storing devices 30. There is one such energy storing device 30 for each charger 28. In the embodiment of FIG. 1, five energy storage devices 30 are provided, thus five corresponding chargers 28 are also provided. The energy storing devices 30 are sodium-nickel-chloride batteries, which will be described in greater detail below. For each energy storing device 30 there is also a corresponding battery management interface 32 that operatively connects each energy storage device 30 with the multiple battery server 26. Each battery management interface 32 provides data to the multiple battery server 26 about the current state of each energy storage device 30, such as its current state during the charging or discharging cycle.

To discharge stored electrical energy from each energy storage device 30, a discharge signal is sent to the power management cabinet 34. The power management cabinet 34 takes the 600 VDC current from the energy storage devices 30 and inverts the direct current to 600 VAC. First, a splitter box 36 takes the multiple 600 VDC lines and consolidates the multiple electrical energy currents into one line and sends the consolidated current to the power management cabinet 34. From the power management cabinet 34, one power line 38 connects back to the power distribution switchboard 22 that in turn is connected to the power grid 20.

Discharge of the electrical energy from the energy storage devices 30 takes place until the power management cabinet 34 receives a signal to stop discharging the energy storage devices 30. A "stop" condition may include one of the following:
 a. power from the energy storage devices 30 is no longer needed;
 b. there is a power outage in the power grid; and
 c. the energy storage devices 30 have reached their maximum discharge point.

After the energy storage devices 30 have discharged their stored electrical energy and a "stop" condition is met, the system 25 will remain idle until a signal is received by the power management cabinet 34 to begin charging the energy storage devices 30. Typically, there will be one charging and one discharging cycle every day (for example, charging will occur at night during an off-peak period and discharging will occur during the day during a peak period). However, it will be understood that the method and system of the present invention may be used for multiple charging and discharging cycles during a given day depending on the occurrences of peak and off-peak periods and/or on the particular market prices for the electrical energy. This is possible due to the ability of the ZEBRAS sodium-nickel-chloride batteries to be rapidly charged and discharged safely.

Thus, the main components of the system 25 of the present invention as shown in FIG. 1 are:
a. the energy storage devices 30;
b. the chargers 28;
c. the power management cabinet 34; and
d. overall system control/monitoring.

The preferred energy storage devices 30 are ZEBRA® sodium-nickel-chloride batteries Type Z37 that are available from MES-DEA in Switzerland. ZEBRA® sodium-nickel-chloride batteries have a high specific energy of about 120 Wh/g. In the system and method of the present invention, sodium/nickel batteries having a specific energy in the range of about 80 to about 200 Wh/kg, preferably about 100 to about 150 Wh/kg, and most preferably of about 120 Wh/g, are preferred. It has been found that the relatively high specific energy of the ZEBRA® sodium-nickel-chloride batteries coupled with their ability to rapidly charge and discharge safely make them especially useful in load shifting applications.

The specifications for the ZEBRA® sodium-nickel-chloride batteries that are preferred for use in the method and system of the present invention are provided in Table 1.

TABLE 1

| | |
|---|---|
| Capacity | 32 Ah |
| Rated Energy | 19.8 kWh |
| Open Circuit Voltage (0-15% DOD) | 620 V |
| Max. Regen. Voltage | 744 V |
| Min. Op. Voltage | 412 V |
| Max. Discharge Current | 112 A |
| Cell Type/Number of Cells | ML3C/240 |
| Weight (with battery management interface) | 207 kg |
| Specific Energy (without battery management interface) | 96 Wh/kg |
| Energy Density (without battery management interface) | 156 Wh/l |
| Energy, 2-hour Discharge | 17.8 kWh |
| Peak Power (⅔ OCV, 30 s, 335° C.) | 36 (DoD 80%) kW |
| Specific Power | 174 W/kg |
| Power Density | 284 W/l |
| Ambient Temperature | −40 to +50° C. |
| Thermal Loss (at 270° C. internal temperature) | <120 W |
| Cooling | Air |
| Heating Time | 24 h at 230 VAC |

The preferred ZEBRA® sodium-nickel-chloride batteries of the present invention each include 240 individual cells. The main components (by weight) of a ZEBRA® sodium-nickel-chloride battery cell appears in Table 2 below, together with "per battery" weights.

TABLE 2

| Material | kg/Cell | kg/Battery (240 Cells) |
|---|---|---|
| Nickel (powder and sheet) | 0.15 | 36.0 |
| Iron (powder and sheet) | 0.14 | 33.6 |
| Copper | 0.03 | 7.2 |
| Halide Salts | 0.22 | 52.8 |
| Beta-alumina (boehmite) | 0.14 | 33.6 |
| Total (kg) | 0.68 | 163.2 |

Figure 2:
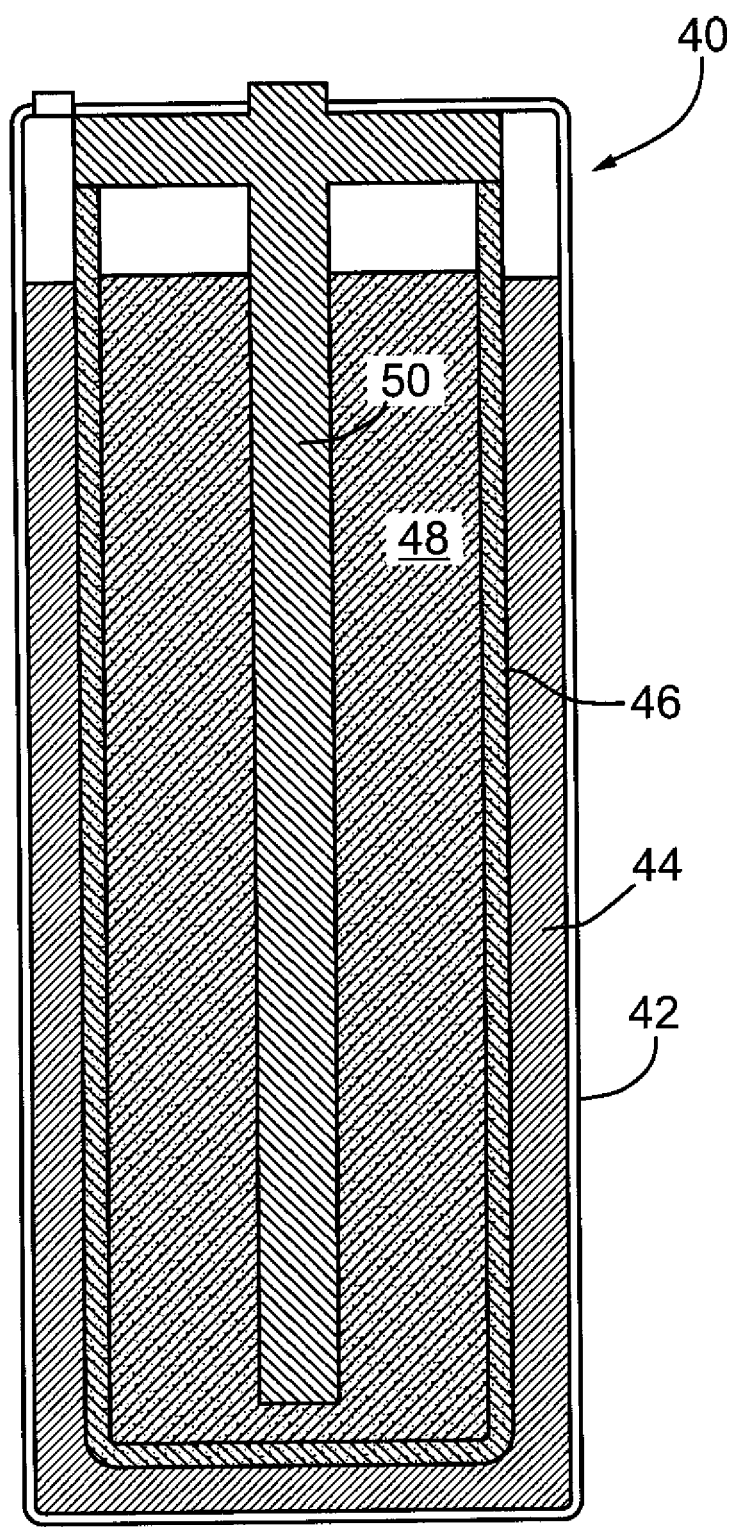
FIG. 2 is a schematic diagram of one cell in the sodium-nickel-chloride batteries shown in FIG. 1.

A schematic diagram of a typical ZEBRA® sodium-nickel-chloride battery cell 40 is shown in FIG. 2. The battery cell 40 includes a cell case 42 (negative pole), sodium 44, ceramic electrolyte 46, nickel chloride and sodium aluminum chloride liquid electrolyte 48 and a current collector 50 (positive pole). Battery-grade nickel is used in the electrode and nickel sheet for the cell current collector 50. Nickel is also used for hermetically sealing the cell 40.

In the ZEBRA® sodium-nickel-chloride battery cell 40, sodium metal is not used even though sodium is the negative electrode. Instead, sodium chloride is used and the sodium electrode is generated by electrolysis during the charging cycle of the battery cell 40.

ZEBRA® sodium-nickel-chloride battery cells 40 are based on the reaction between sodium metal and a transition metal chloride. Nickel chloride is the preferred electrode material because it has the advantage of a higher open circuit voltage (2.58 V). A sodium ion-conducting beta alumina electrolyte separates the anode and cathode. A liquid electrolyte, sodium aluminum chloride, is used to transfer sodium ions from the beta alumina to the solid metal chloride. The cell 40 operates in the range of 270 to 350° C., well above the melting points of sodium (98° C.) and the liquid electrolyte (155° C.), and in the region where the beta alumina conductivity is high enough to allow high power to be drawn.

The main reaction in the ZEBRAS sodium-nickel-chloride battery cells 40 involves chlorination of high surface area nickel powder with sodium chloride, to form the nickel chloride positive electrode and sodium. The overcharge and over-discharge reactions are as follows:

$$NiCl_2 + 2Na + 2AlCl_3 \leftrightarrow 2NaAlCl_4 + Ni \quad \text{Overcharge}$$

$$Ni + 2NaCl \leftrightarrow Na + NiCl_2 \quad \text{Cell Reaction}$$

$$4NaCl + Al \leftrightarrow NaAlCl_4 + 2Na \quad \text{Over-Discharge}$$

In the battery cells 40, use is made of the over-discharge reaction to allow assembly of the cells without addition of elemental sodium. The positive electrode is located inside the beta alumina tube. This architecture enables square cells to be used, which gives maximum packing efficiency and ensures the absence of corrosion in each cell, thus leading to long life and high reliability.

Battery cells 40 are then assembled into a battery casing and connected to give the required battery voltage and capacity. Preferably, the overall battery case is composed of a double-walled stainless steel box, the cooling system, and microporous foamed silica plates that fill the gap between the inner and outer walls. The battery case provides a very low heat conductivity of 0.006 W/mK (watts per meter per Kelvin).

In the ZEBRA® sodium-nickel-chloride batteries, the cells 40 are contained in an insulated battery box. Low heat loss is achieved due to the use of the double-walled stainless steel box in which 20-30 mm of insulation board is sandwiched between the two walls. This construction results in a low heat loss, with the heat loss being in the range of about 90 w for a 20 kWh battery, with the outer wall temperature about 5 to 10° C. above ambient with an internal temperature of 300° C. The ZEBRA® sodium-nickel-chloride battery is heated to operating temperature and maintained at that temperature by a resistance heater. Heat is generated during discharge, as the discharge voltage is always below the thermal neutral potential (2.72 V for the nickel system).

As mentioned above, the open circuit voltage of each single ZEBRA® sodium-nickel-chloride battery cell 40 is 2.58 V. Many cells 40 are therefore connected in a long series string to give high battery voltages.

Referring back to FIG. 1, each ZEBRA® sodium-nickel-chloride battery 30 is operatively connected to its corresponding battery management interface 32 that comprises a microprocessor management system to continuously monitor voltage, current, temperature, and state of charge for the corresponding battery 30. Each battery management interface 32 communicates with the external load and its corresponding charger 28 via a controller area network 39 bus system. Thus, each ZEBRA® sodium-nickel-chloride battery 30 is controlled by its associated battery management interface 32, which controls all the operating modes of the battery 30, including discharge, normal charge through its dedicated charger 28, fast charge through power terminals and modifies voltage and current limits depending on the type of operation and on the state of the battery 30.

Moreover, each battery management interface 32 may periodically run a series of online tests. Typical tests may include checking the associated battery's health status, such as calculating the number of healthy cells, and battery insulation tests. Other tests may dynamically control battery functioning parameters, such as battery current/voltage and internal temperature, both in charge and discharge modes.

In the system of FIG. 1, the system 25 converts 208 VAC electrical energy into 600 VDC current for storage in the ZEBRA® sodium-nickel-chloride batteries 30. The components of the system 25 include the chargers 28, the multiple battery server 26, the batteries 30, and computer hardware and software for controlling these components.

There is one charger 28 for each energy storage device or battery 30 in the overall system 25. The chargers 28 are readily available components that convert the inputted 208 VAC current into 600 VDC current.

In systems were multiple energy storage devices or batteries 30 are used, it is necessary to add a controller unit, referred to as the multiple battery server 26, to manage all of the system's components. The multiple battery server 26 monitors the performance of each energy storage device or battery 30 (for example its temperature, state of charge) and controls the current that enters or leaves each battery 30. The multiple battery server 26 is connected to a typical computer hardware system 41 that runs software useful for monitoring the state of the system 25 and controlling current flow within the system 25.

On the discharge side of the system 25, the power management cabinet inverts 600 VDC current received from each of the energy storage devices or batteries 30 into 600 VAC current, which is then fed back into the overall power grid 20 via the power distribution switchboard 22. The power management cabinet 34 contains commercially-available, off-the-shelf components for inverting the 600 VDC current into 600 VAC current.

In the preferred embodiment shown in FIG. 1, the controller area network 39 is used, which consists of multiple micro controllers that communicate with each other via a 2-wire bus. The controller area network 39 is run by a dedicated controller and includes three separate buses that circulate throughout the system 25 to transfer data between components. The first connects the multiple battery server 26 with each battery 30 so that data from the individual batteries 30 is consolidated into "system" data by the multiple battery server 26. The second bus moves consolidated "system" data from the multiple battery server 26 to the monitoring and controlling software 41. The third bus links the battery discharger activities/status of the power management cabinet 34 with the monitoring control software 41.

Therefore, in use, the preferred method and system of the present invention shown in FIG. 1 is able to store excess electrical energy from the power grid 20 produced during off-peak periods, and then discharge the stored electrical energy back into the power grid 20 during peak periods. During the off-peak periods, electrical power from the power grid 20 is converted to 208 VAC current before being directed into the multiple battery server 26, where the current is then directed to each charger 28 as necessary. The 208 VAC current is converted by each charger 28 into 600 VDC current and then stored in each energy storage device or battery 30. Preferably, the energy storage device 30 is a sodium/nickel high-energy battery having a specific energy in the range of about 80 to about 200 μm/kg, preferably about 100 to about 150 Wh/kg, most preferably about 120 μm/kg. The electrical energy is stored in each of the batteries 30 until a peak period occurs, at which time the stored electrical energy is discharged from the batteries 30, directed into the splitter 36 where the 600 VDC currents are combined into one 600 VDC current. The 600 VDC current is then inverted into a 600 VAC current in the power management cabinet 34 before being sent back into the power grid 20.

Although the present invention has been shown and described with respect to its preferred embodiments and in the examples, it will be understood by those skilled in the art that other changes, modifications, additions and omissions may be made without departing from the substance and the scope of the present invention as defined by the attached claims.

What is claimed is:

1. A system for storing electrical energy during an off-peak period and distributing the electrical energy during a peak period, wherein the system comprises:

an energy storage means comprising at least two sodium-nickel-chloride batteries having a specific energy in the range of about 80 to about 200 Wh/kg, each battery having a corresponding battery management interface and an operating mode;

a multiple battery server comprising monitoring control software for monitoring the system and for controlling current flow within the system, the multiple battery server being configured to receive data relating to each battery from each corresponding battery management interface;

a first means for directing the electrical energy produced during the off-peak period into the energy storage means comprising at least one charger for converting alternating current into direct current and the multiple battery server controlling the flow of the alternating current into the at least one charger, wherein the direct current is stored in the energy storage means;

a second means for directing the electrical energy from the energy storage means during the peak period comprising a power management cabinet for controlling the discharge of the stored electrical energy from the energy storage means, the power management cabinet configured to receive a discharge signal and a stop discharging signal from the monitoring control software.

2. The system of claim 1, wherein the energy storage means is at least five sodium-nickel-chloride batteries having a specific energy in the range of about 80 to about 200 Wh/kg.

3. The system of claim 2, wherein the energy storage means is at least five sodium-nickel-chloride batteries having a specific energy in the range of about 100 to about 150 Wh/kg.

4. The system of claim 1, wherein the second means further comprises an inverter for inverting the stored electrical energy to alternating current.

5. The system of claim 1, wherein the energy storage means comprises at least one sodium-nickel-chloride battery having a specific energy in the range of about 100 to about 150 Wh/kg.

6. The system of claim 1, wherein the energy storage means comprises at least one sodium-nickel-chloride battery having a specific energy of about 120 Wh/kg.

7. The system of claim 1, wherein the data relating to each battery comprises the corresponding battery's voltage, current, temperature and state of charge.

8. The system of claim 1, wherein the operating mode comprises discharge mode, normal charge mode, and fast charge mode.

9. A method of storing electrical energy during an off-peak period and distributing the stored electrical energy to a power grid for use by consumers during a peak period, the method comprising the steps of:
converting electrical energy that is produced during the off-peak period into direct current and directing the electrical energy that is produced during the off-peak period into an energy storage means comprising at least two sodium-nickel-chloride batteries having a specific energy in the range of about 80 to about 200 Wh/kg;
storing the electrical energy in the energy storage means until the peak period; and
inverting the stored electrical energy into alternating current and directing the stored electrical energy from the energy storage means into the power grid for use by the consumers during the peak period, wherein the peak period is when the market cost of the electrical energy is higher than the market cost of the electrical energy during the off-peak period.

10. The method of claim 9, wherein the energy storage means is at least five sodium-nickel-chloride batteries having a specific energy in the range of about 80 to about 200 Wh/kg.

11. The method of claim 10, wherein the energy storage means is at least five sodium-nickel-chloride batteries having a specific energy in the range of about 100 to about 150 Wh/kg.

12. The method of claim 9, wherein the energy storage means is comprises at least one sodium-nickel-chloride battery having a specific energy in the range of about 100 to about 150 Wh/kg.

13. An electrical load levelling system for storing electrical energy during an off-peak period and distributing the electrical energy to consumers during a peak period, wherein the system comprises:
at least one charger for converting alternating current into direct current,
a multiple battery server for controlling the flow of the alternating current into the at least one charger,
at least two energy storage devices for storing the direct current electrical energy from a corresponding charger,
an inverter for inverting the direct current electrical energy into alternating current electrical energy, and
a power management cabinet for controlling the discharge of the stored electrical energy from each storage device to the inverter, and for directing the alternating current electrical energy to the consumers during peak periods,
wherein the each energy storage device is a sodium-nickel-chloride battery having a specific energy in the range of about 80 to about 200 Wh/kg, each energy storage device having a corresponding management interface and an operating mode, the corresponding management interface configured to send data relating to the corresponding battery's voltage, current, temperature and state of charge to the multiple battery server.

14. The system of claim 13, wherein the energy storage device is at least five sodium-nickel-chloride batteries having a specific energy in the range of about 80 to about 200 Wh/kg.

15. The system of claim 14, wherein the energy storage device is at least five sodium-nickel-chloride batteries having a specific energy in the range of about 100 to about 150 Wh/kg.

16. The system of claim 13, wherein the energy storage device is comprises at least one sodium-nickel-chloride battery having a specific energy in the range of about 100 to about 150 Wh/kg.

17. The system of claim 13, wherein the energy storage device is comprises at least one sodium-nickel-chloride battery having a specific energy of about 120 Wh/kg.

18. The system of claim 13, wherein the operating mode comprises discharge mode, normal charge mode, and fast charge mode.

* * * * *

UNITED STATES PATENT AND TRADEMARK OFFICE
CERTIFICATE OF CORRECTION

PATENT NO. : 8,228,034 B2  
APPLICATION NO. : 11/958650  
DATED : July 24, 2012  
INVENTOR(S) : Guatto et al.

Page 1 of 1

It is certified that error appears in the above-identified patent and that said Letters Patent is hereby corrected as shown below:

IN THE CLAIMS:

Claim 12, Column 9, Line 33, "is comprises" should read --comprises--.

Claim 16, Column 10, Line 28, "is comprises" should read --comprises--.

Claim 17, Column 10, Line 32, "is comprises" should read --comprises--.

Signed and Sealed this  
Second Day of October, 2012

David J. Kappos  
*Director of the United States Patent and Trademark Office*